United States Patent
Coles et al.

(10) Patent No.: US 7,130,404 B2
(45) Date of Patent: Oct. 31, 2006

(54) APPARATUS AND METHOD FOR PROVIDING ADVANCED COMMUNICATION CONFERENCING OPERATIONS

(75) Inventors: Scott David Coles, Christchurch (NZ); Christopher Reon Gentle, Sydney (AU); Christopher Michael Goringe, Seven Hills (AU); Rodney Harrison, Putney (AU); Julian James Orbach, Ryde (AU)

(73) Assignee: Avaya Technology Corp., Basking Ridge, NJ (US)

( * ) Notice: Subject to any disclaimer, the term of this patent is extended or adjusted under 35 U.S.C. 154(b) by 534 days.

(21) Appl. No.: 10/393,794

(22) Filed: Mar. 18, 2003

(65) Prior Publication Data

US 2004/0184586 A1 Sep. 23, 2004

(51) Int. Cl.
*H04M 3/42* (2006.01)
*H04M 11/00* (2006.01)

(52) U.S. Cl. .............................. 379/202.01; 379/88.14

(58) Field of Classification Search ......... 379/202–206
See application file for complete search history.

(56) References Cited

U.S. PATENT DOCUMENTS

| | | | | |
|---|---|---|---|---|
| 5,710,591 A | * | 1/1998 | Bruno et al. | 348/14.09 |
| 5,818,436 A | * | 10/1998 | Imai et al. | 715/500.1 |
| 6,278,772 B1 | | 8/2001 | Bowater et al. | |
| 6,292,781 B1 | | 9/2001 | Urs et al. | |
| 6,823,050 B1 | * | 11/2004 | Brown et al. | 379/93.21 |
| 6,850,609 B1 | * | 2/2005 | Schrage | 379/202.01 |

* cited by examiner

*Primary Examiner*—Fan Tsang
*Assistant Examiner*—Simon Sing
(74) *Attorney, Agent, or Firm*—John C. Moran

(57) ABSTRACT

Producing a textual transcription of a communication conference call. A participant who is going to be absent from the conference can indicate to a conference bridge key words defining topics of interest, and the conference bridge will identify these topics based on the textual transcript that is being done in real time. When the participant returns to the conference call, they can then search the portion of an audio recording that they missed utilizing index marks defining the topics of interest that are based on the entered key words.

44 Claims, 11 Drawing Sheets

an apparatus and method for
providing advanced communication
conferencing operations

TECHNICAL FIELD

This invention relates to telecommunication switching systems, and in particular, to the provision of conferencing operations.

BACKGROUND OF THE INVENTION

Within the prior art, it is well known to use conference bridges to provide telecommunication conferences where a plurality of individuals can simultaneously participate in a telecommunication call from a variety of geographical locations. Such telecommunication conference calls are well known to be capable of supporting not only audio but also video information. During a telecommunication conference call that involves a number of individuals, a specific person may not be interested in all of the topics that are to be covered in the conference call but rather is interested in only a particular topic. Unfortunately, this person must listen and pay attention to the whole telecommunication conference call in order to identify when the discussion concerns their particular topic. Also, during a large telecommunication conference call which may span several hours, a person may need to leave the conference call for a brief amount of time. However, when the person steps away from the conference call, they may miss important information in which they were interested.

SUMMARY OF THE INVENTION

The aforementioned problems are solved and a technical advance is achieved in the art by an apparatus and method that produce a textual transcription of an entire communication conference call is generated. A participant in the communication conference call can leave the conference call for a short period of time and then, utilize accelerated speech to listen to a recorded portion of the conference during which they were absence. In addition, the participant who is going to be absent from the conference can indicate to the conference bridge key words defining topics of interest, and the conference bridge will identify these topics based on the textual transcript that is being done in real time. When the participant returns to the conference call, they can then search the portion of the audio recording that they missed utilizing index marks defining the topics of interest that are based on the entered key words.

A conference participant who is only interested in a small number of topics to be discussed during the conference can enter key words defining the topics to the conference bridge. When one of the topics is identified by a key word, the participant is alerted so that they can now participate in the conference.

DETAILED DESCRIPTION

Figure 1:
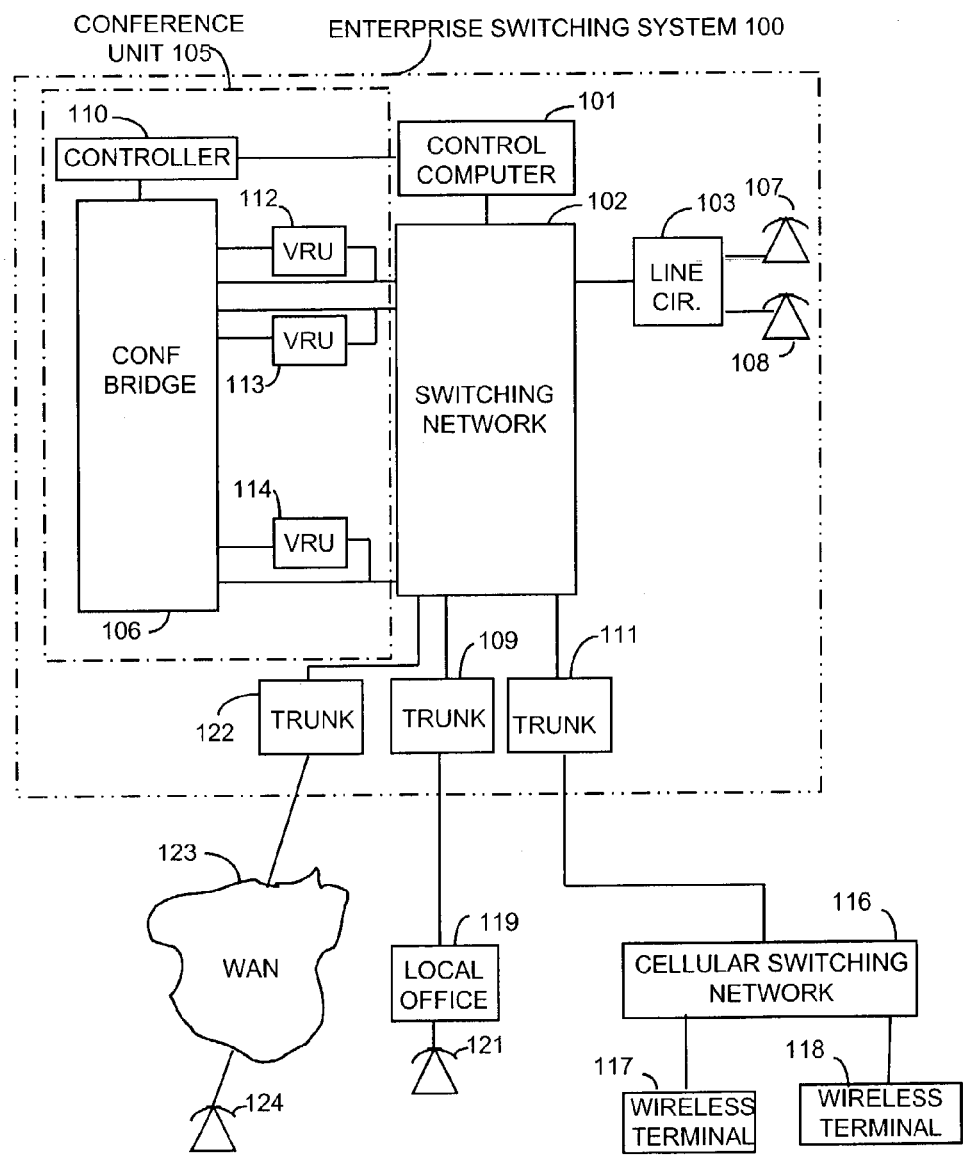
FIG. 1 illustrates an embodiment for implementing the invention.

FIG. 1 illustrates an embodiment for implementing the invention. Enterprise switching system 100 provides conferencing operations by the utilization of conference unit 105 that includes controller 110, conference bridge 106, and voice recognition units (VRU) 112–114. The switching of information is performed by switching network 102 under control of control computer 101. One skilled in the art would readily recognize that the functions performed by control computer 101 and switching network 102 could be provided by a distributed switching system having a plurality of switching elements such as but not limited to a packet switching network or a distributed circuit switching network. Line circuits 103 provide an interface to switching network 102 for telecommunication terminals 107–108. Local office 119 is interconnected to switching network 102 via trunk 109, and cellular switching network 116 is interconnected to switching network 102 via trunk 111. In the embodiment illustrated in FIG. 1, control computer 101 provides overall control of conference unit 105. However, one skilled in the art would readily realize that conference unit 105 could be an independent unit directly receiving control from the telecommunications terminals that were participating in the telecommunication conference.

During a conference call, a text transcription of the call is performed by assigning individual voice recognition units to each participant in the conference call. This is done by switching network 102 under control of control computer 101 providing an output that is particular to one individual participant in the conference call to a specified voice recognition unit. The voice recognition unit transcribes only the audio information coming from the specified participant and places time stamped information in the resulting text before transferring it to conference bridge 106. One skilled in the art would readily realize that a group of participants could be utilizing a conference telecommunication unit and that one voice recognition unit could be used for that conference telecommunication unit. This voice recognition unit could use a trained or untrained algorithm. Advantageously, the trained algorithm would be adapted for the group of participants.

Conference bridge 106 is responsive to the time stamped textual information from all of the voice recognition units to merge this textual information into a combined textual document or computer file by means of the time stamps that had been inserted into the textual information by each of the voice recognition units. Conference bridge 106 maintains time stamps in the merged textual information so that the information can be searched on the basis of time. Conference bridge 106 also maintains an audio recording of the conference call.

If a participant needs to leave the conference for a short period of time, the participant can simply excuse themselves from the conference call or simply walk out. Upon their return, the participant may request that conference bridge 106 commence accelerated playback of the conference for the period of time that the participant was absent from the conference call. Once the accelerated playback has caught up with the conference call in real time, the accelerated playback ceases. One skilled in the art would readily know mechanisms for performing the accelerated playback. Two methods that are known within the art are to eliminate large portions of the silent intervals within a conversation and the other is to remove a certain number of pitch periods from the recorded speech.

The participant who is going to be absent from the conference call for a brief period of time can also indicate to conference bridge 106 key words that define topics of interest. Conference bridge 106 will then search the merged textual information for these key words. When a key word is detected in the merged textual information, conference bridge 106 marks that portion of the recorded audio information. When the participant returns to the conference call, the participant can request that conference bridge 106 playback at an accelerated rate only those portions of the conference call that include the topics of interest. The accelerated playback continues until the participant who had been absent catches up in real time with the conference call.

When a participant in the conference call wishes to only participate during certain topics, the participant enters key words defining the topics of interest into conference bridge 106 and signals to the conference bridge the desired participation mode. Conference bridge 106 is responsive to these key words to search for the key words through the merged textual information. When a key word is detected, conference bridge 106 alerts the participant by either increasing the volume of the participant's telecommunication terminal or sending an audio alerting tone to the telecommunication terminal. One skilled in the art could envision a number of methods that could be utilized by conference bridge 106 to alert the participant that their topic of interest was now under discussion in the conference call. Such methods could included but not be limited to alerting tones, instant messaging, electronic paging, etc.

Figure 2:
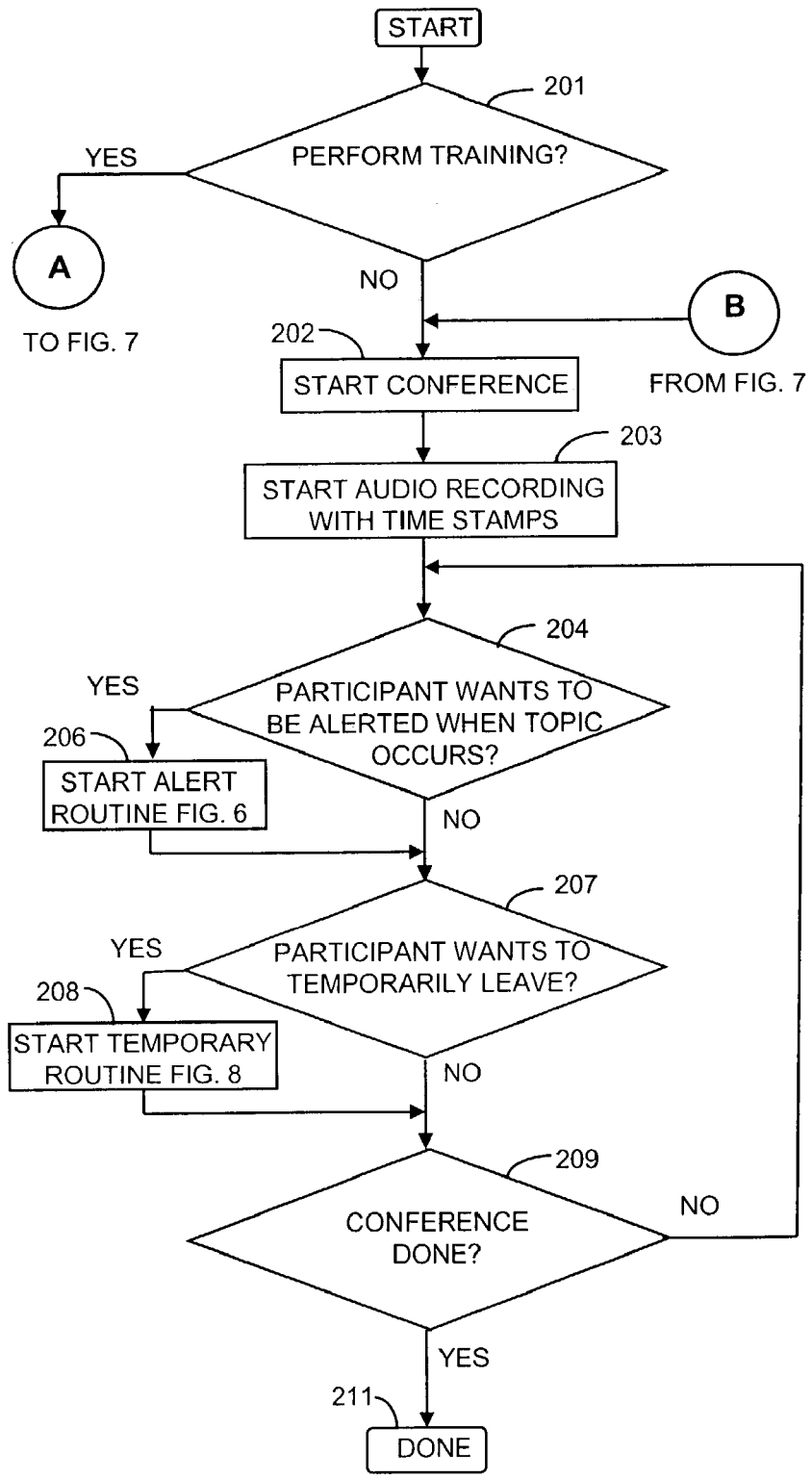
FIG. 2 illustrates, in flowchart form, operations performed by one embodiment of a controller in accordance with the invention.
Figure 7:
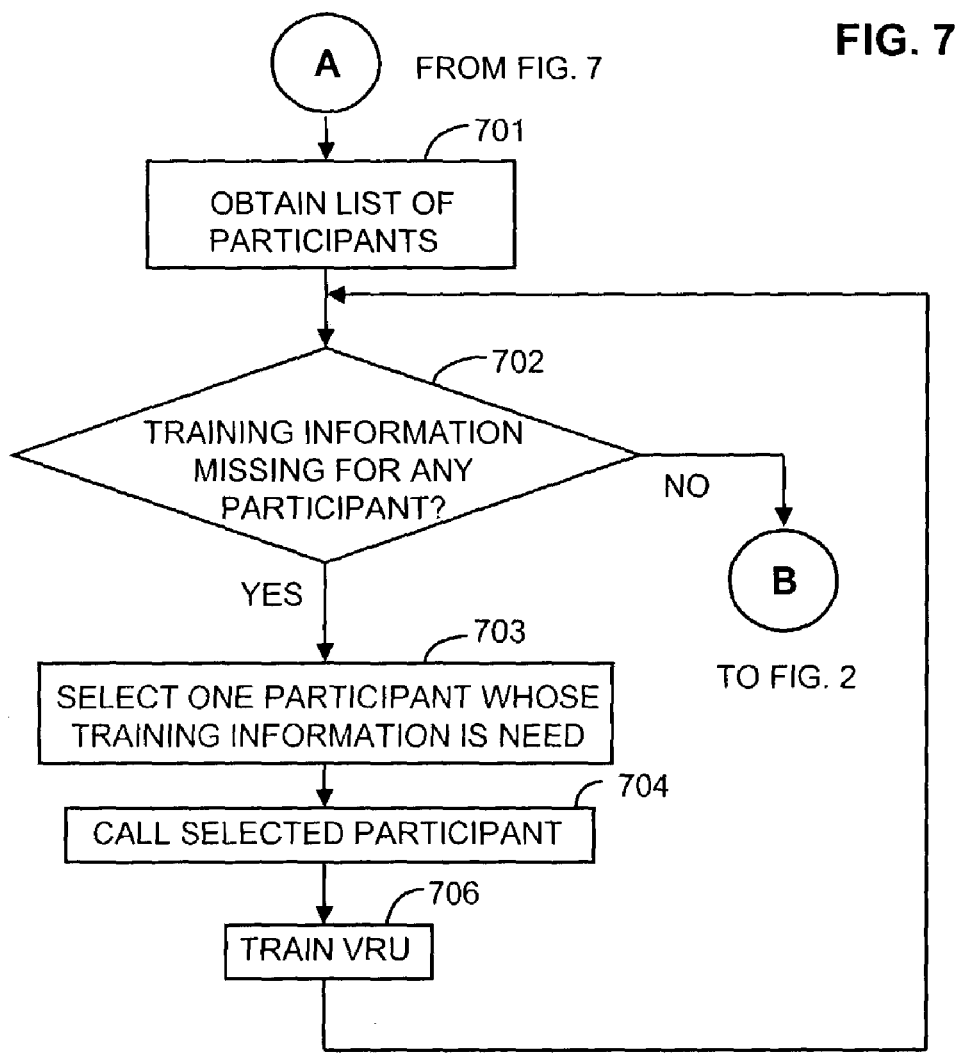

FIG. 2 illustrates, in flowchart form, the overall operations performed by conference unit 105 in cooperation with control computer 101. Once started by a request to establish a conference, decision block 201 determines whether or not the voice recognition units need to be trained for particular participants in the conference. In general, if training is required, it will be done before the conference starts. In addition, as is illustrated in FIG. 7 that details the operations required to train the voice recognition units (VRU 112–114), controller 110 can maintain the training information that had been performed for individual participants on previous conference calls. If decision block 210 determines that the VRU's must be trained, control is transferred to FIG. 7. After training is performed or if no training is required, control is transferred to block 202 that starts the conference. One skilled in the art would recognize that VRU's that use untrained algorithms could also be used with a possibility of less accuracy in the recognition of words.

Figure 3:
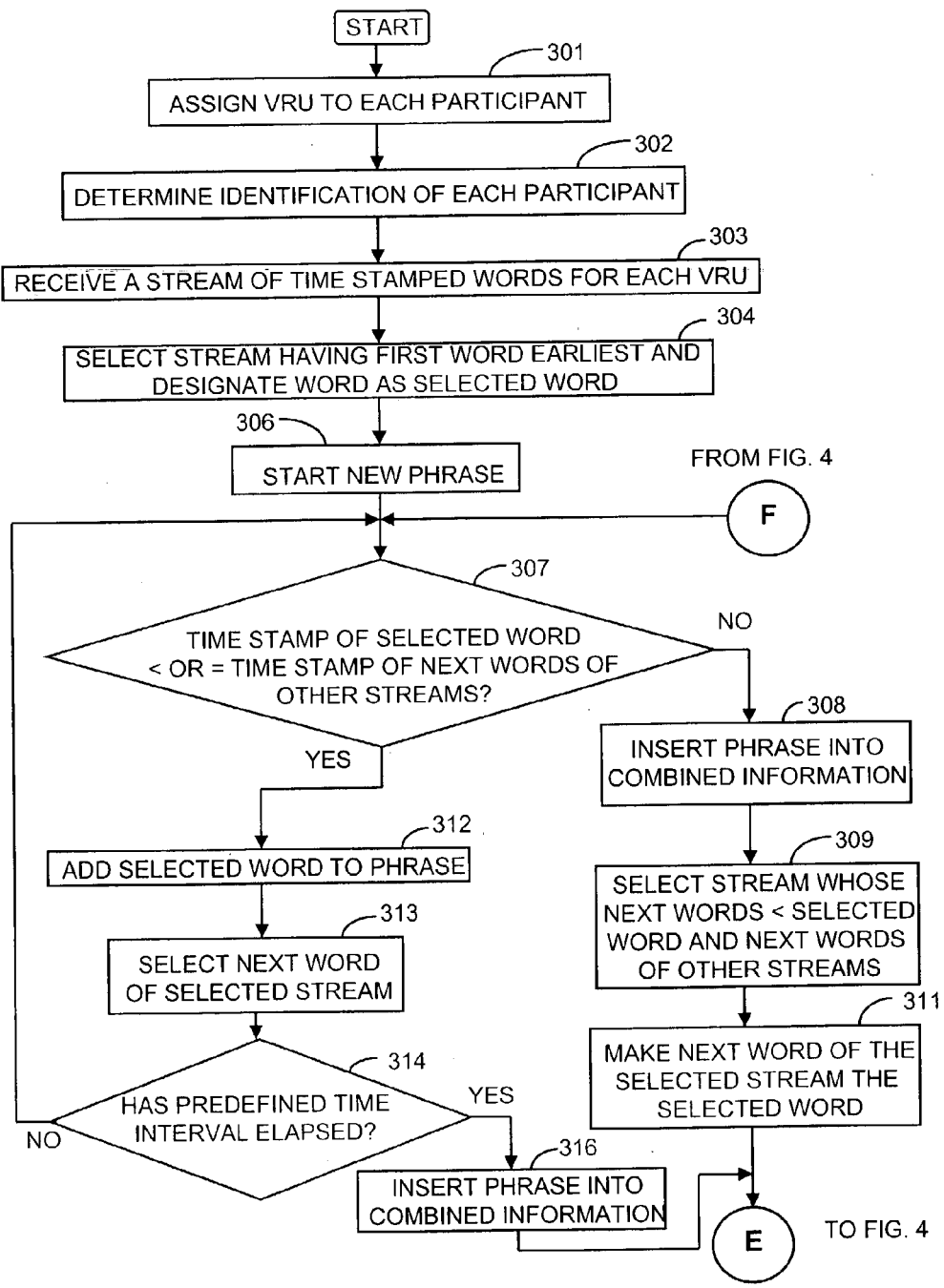
FIG. 3 illustrates, in flowchart form, operations performed by an embodiment of the controller in accordance with the invention.
Figure 4:
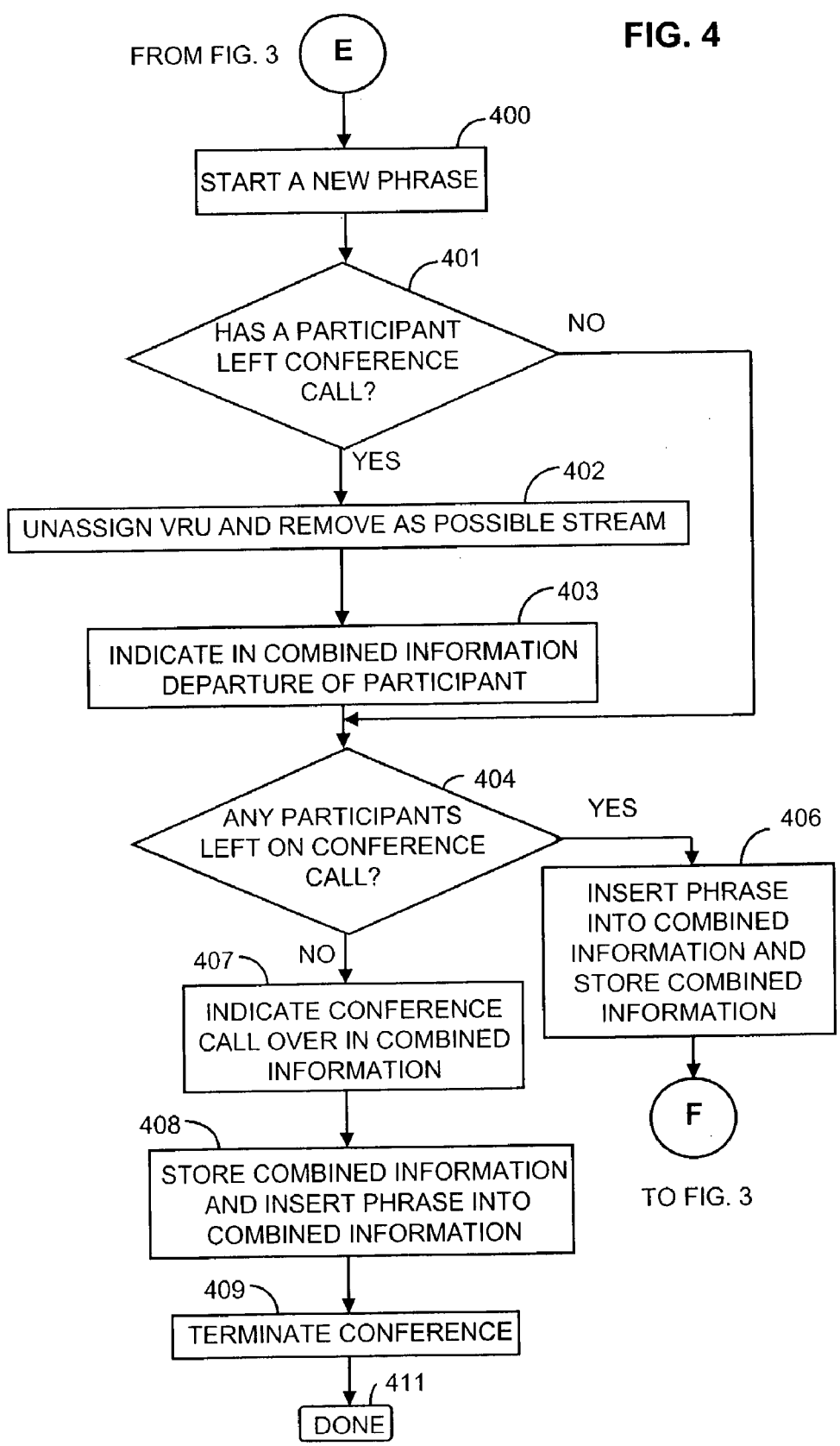

The starting of the conference initiates the operations illustrated in FIGS. 3 and 4 that perform the operations of converting the audio information into text information. The operations illustrated in FIGS. 3 and 4 are performed by processes that execute independent of the other processes that are illustrated in FIG. 2. After execution of block 202, control is transferred to block 203.

Block 203 starts the audio recording of the conference with time stamps added to this audio information for later searching operations. Together, blocks 202 and 203 initiate the operations that will convert the conference call to both text and audio information with each of these media forms having time stamps inserted into the information so that the two different media types can be collated.

After execution of block 203, block 204 determines if any of the participants want to commence full participation in the conference only after a particular topic occurs in the conference. By invoking the operation of only being alerted when a specified topic arises of in the conference, a participant can perform other types of work until the topic arises in the conference. In one embodiment, the telecommunication terminal of the participant is placed in the condition where the conference's audio information is presented in a low volume. When the topic of interest occurs, the volume is increased. In another embodiment of the invention, the audio information would be muted until the topic of interest occurs. In addition, in one embodiment of the invention, the topic of interest not only has to occur but a particular participant must be speaking of this particular topic. If the participant wants to be alerted when a topic occurs, decision block 204 transfers control to block 206. Block 206 initiates the operations illustrated in FIG. 6. These operations will run distinct from the other operations illustrated in FIGS. 2–9. Regardless of whether or not the participant wants to be alerted when a topic occurs, control is eventually transferred to decision block 207.

Decision block 207 determines if a participant who is presently active on the conference wants to temporarily leave the conference but rejoin the conference at a later point in time. This operation allows a participant to temporarily perform other tasks outside of their office, for example, and be able to receive audio or text information relating to the portion of the conference that occurred during their absence upon their return. If the participant chooses to receive audio information, this information will be played back to the participant at an accelerated rate until the participant catches up with the present state of the conference. In addition, one embodiment allows the participant to specify a topic and optionally a speaker which will determine at what missed portion of the conference the participant will receive upon their return to the conference. This allows the participant upon their return to only review that portion of the conference of interest.

Figure 8:
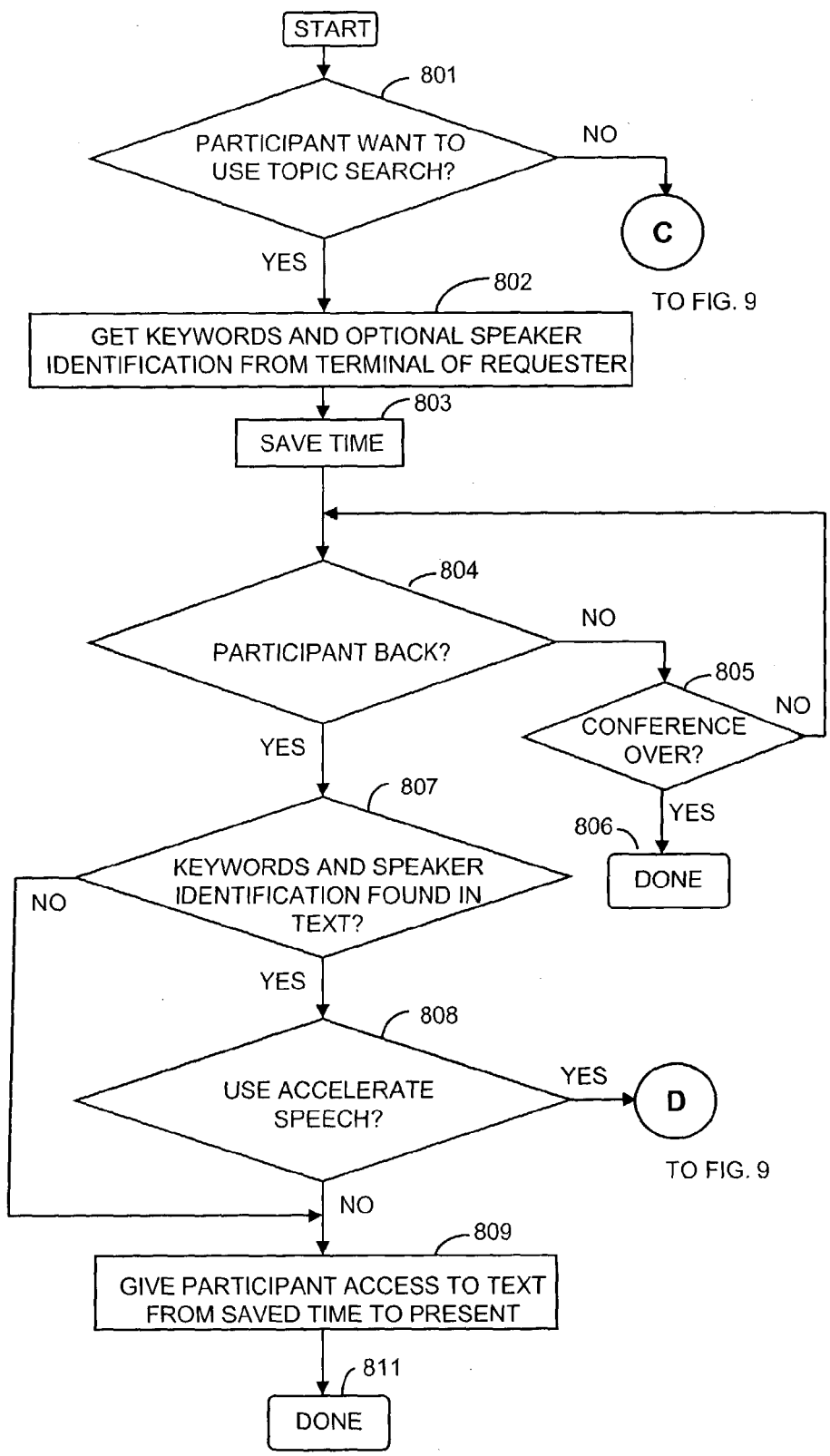
Figure 9:
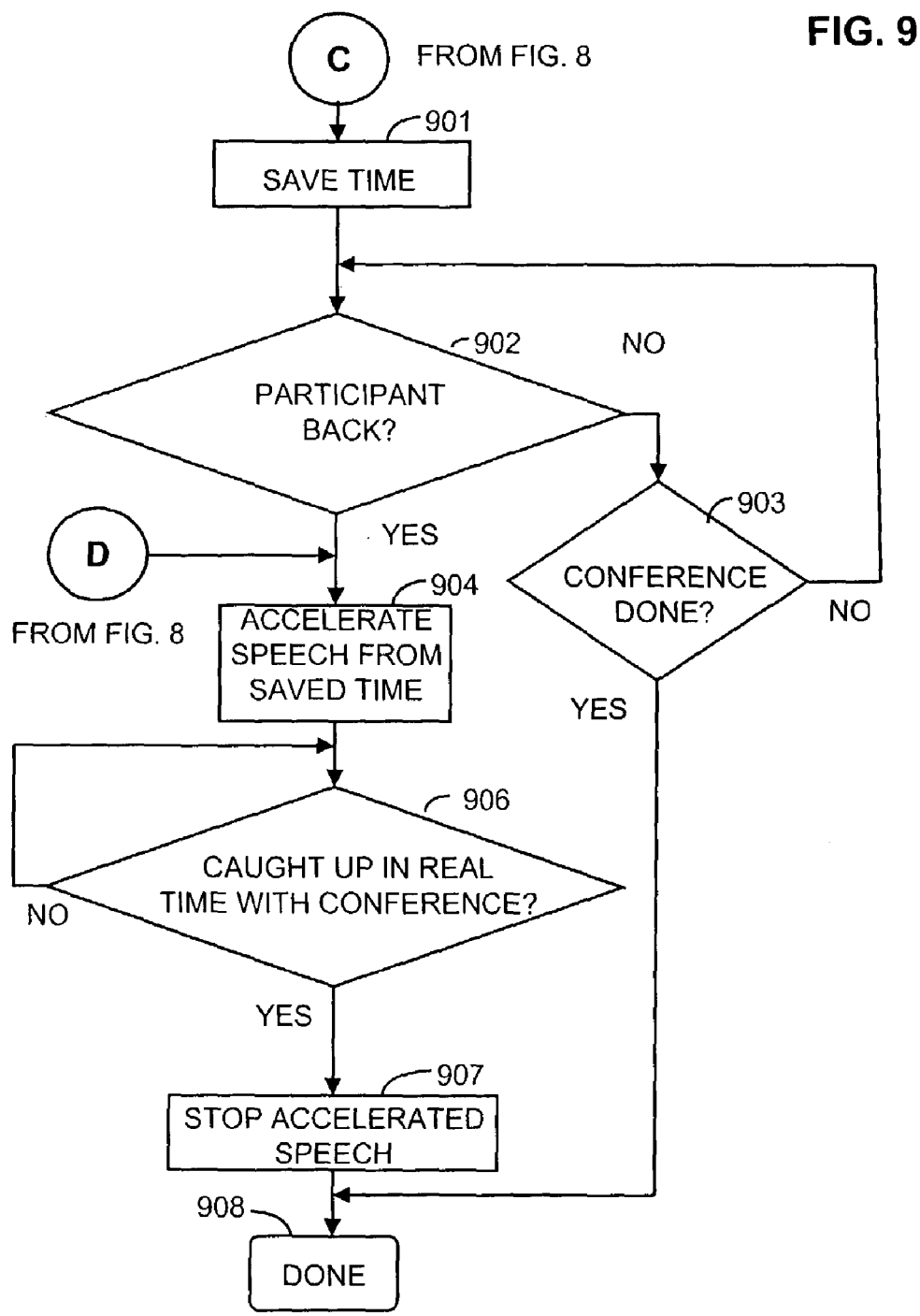

If the participant wants to temporarily leave the conference, decision block 207 transfers control to block 208 which initiates the operations illustrated in FIGS. 8 and 9. The operations of FIGS. 8 and 9 will be performed in conjunction with other operations of the conference. Regardless of whether or not the participant wants to temporarily leave the conference, control will eventually be transferred to decision block 209 which determines if the conference has ended. If the answer is no, control is transferred back to decision block 204. If the answer is yes, control is transferred to block 211, and the conference is terminated.

Returning to decision block 201 of FIG. 2, if the decision is to perform training for the voice recognition units, control is transferred to block 701 of FIG. 7. Block 701 obtains the lists of participants. In particular, block 701 receives the telephone numbers of the participants. Control is transferred to decision block 702 from block 701. Block 702 determines from an internal database whether the training information is missing for any of the participants. If the answer is no, control is transferred back to block 202 of FIG. 2. If the answer is yes in decision block 702, block 703 selects one of the participants whose training information is needed, and block 704 places a call to the selected participant. Block 706 then performs the training operations that are well known by those skilled in the art. After execution of block 706, control is transferred back to decision block 702.

Returning to block 202 of FIG. 2, some of the operations performed by block 202 are illustrated in greater detail in FIGS. 3 and 4. Once the operations of FIGS. 3 and 4 are initiated by the execution of block 202, they will continue until the conference is terminated. The operations of FIGS. 3 and 4 are directed to the acquisition of the textual information of the conference. In FIG. 3, block 301 first assigns individual VRUs to each participant. This operation would be performed in one embodiment of the invention by controller 110 and control computer 101 exchanging messages so that control computer 101 establishes connections via switching network 102 to the appropriate VRU. After execution of block 301, block 302 determines the identification of each participant. In one embodiment of the invention, this information is extracted from databases maintained either by controller 110 or control computer 101 that defines who the participants are. In another embodiment of the invention, the identification of the participants is determined by the voice recognition units. After execution of block 302, block 303 receives a stream of time stamped words from each of the VRUs. Block 304 selects the stream of time stamped words that has the earliest word in comparison to words of the other streams. This word is designated as the select word. Control is then transferred to block 306 that starts a new phrase of words to be formed.

Decision block 307 determines if the time stamp of the selected word is less than or equal to the time stamp of the next words of the other streams. If the answer is yes, control is transferred to block 312 which adds the selected word to the phrase that is being formed. A phrase is formed from the words of one stream as long as the words from the selected stream have a time stamp less than the next word from the other streams.

After the selected word has been added to the phrase, block 313 selects the next word from the selected stream and designates this as the selected word before transferring control to decision block 314. Decision block 314 determines whether the present phrase has been accumulated for longer than a predefined time interval. This is to take into account that one participant may speak for a long period of time and the desire to have text information with time stamps at intervals no greater than the predefined time interval. If the answer in decision block 314 is no, control is transferred back to decision block 307. If the answer in decision block 314 is yes, control is transferred to block 316 which inserts the phrase into the combined information before transferring control to decision block 400 of FIG. 4. The combined information is the total text so far transcribed for the conference. The text in the combined information has time stamps so that it can be accessed based on time. In addition, the combined information is also indexed by the participant who was speaking at that time.

Returning to decision block 307. If the answer is no indicating that the selected stream is no longer the earliest spoken information, control is transferred to block 308 which inserts the phrase that had thus far been accumulated into the combined information. Next, block 309 determines the stream whose next word is less than the selected word and the next words of the other streams. Block 311 then makes the next word of the selected stream the selected word. After execution of block 311, control is transferred to decision block 400 of FIG. 4.

Block 400 starts a new phrase before transferring control to decision block 401. Decision block 401 determines if any participant had left the conference call. If the answer is yes, the VRU that was assigned to that participant is unassigned, and the stream of words that had been being received from the unassigned VRU are marked as inactive. After execution of block 402, block 403 indicates in the combined information the departure of the participant before transferring control to decision block 404. Returning to decision block 401, if the answer is no, control is transferred to decision block 404.

Decision block 404 determines if there are any participants left on the conference call. If there are no participants left on the conference call, then the conference call is completed. If the answer in decision block 404 is yes, block 406 inserts the phrase into the combined information, stores the combined information, and transfers control back to block 307 of FIG. 3. If the answer in decision block 404 is no, block 407 indicates that the conference call is over in the combined information. Block 408 stores the combined information, and block 409 terminates the conference which terminates the various independent operations that have been described with respect to FIG. 2.

Figure 5:
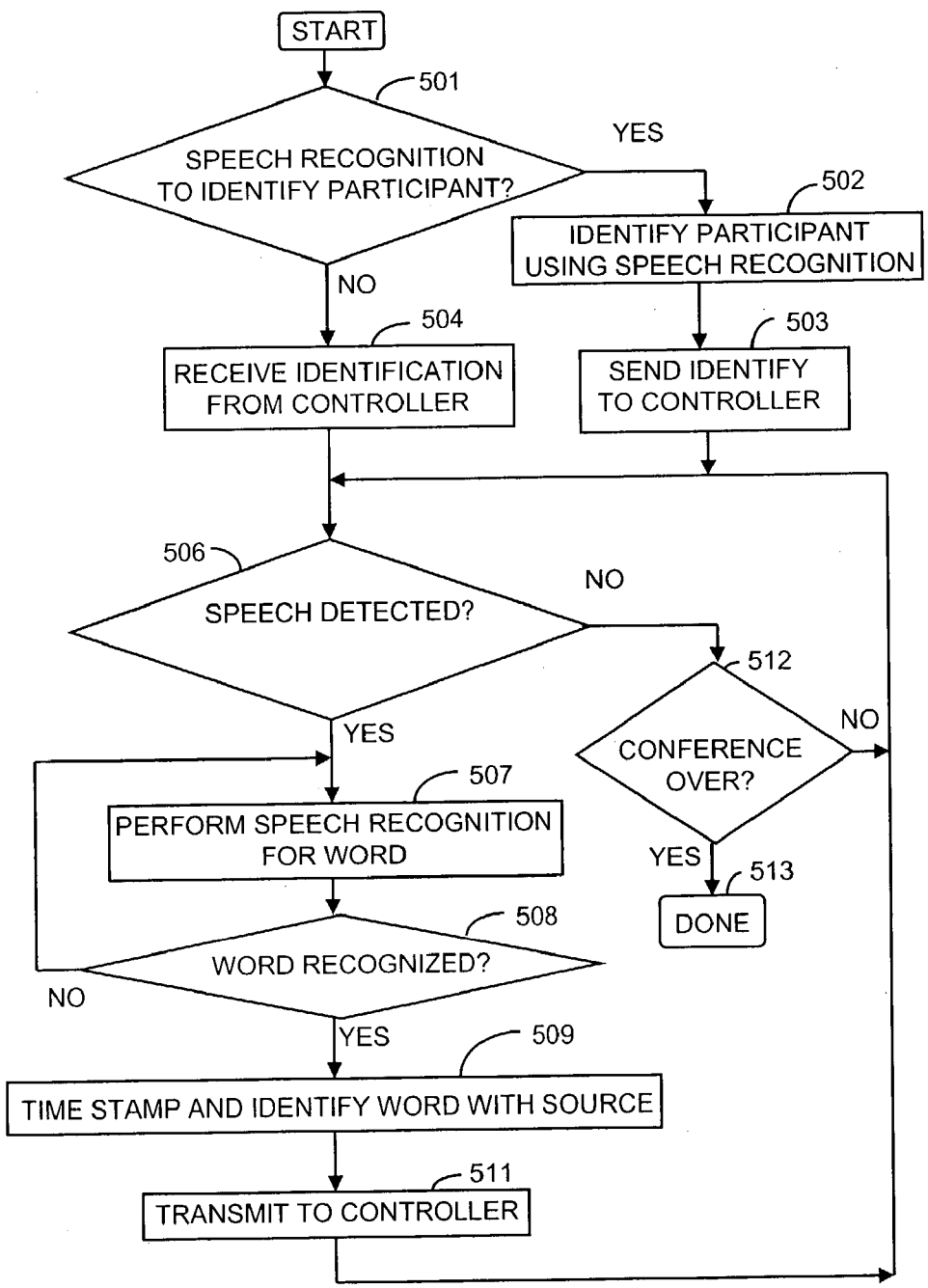
FIGS. 5–9 illustrate, in flowchart form, operations performed by an embodiment of the invention.

FIG. 5 illustrates the operations performed by each VRU. First, decision block 501 determines whether or not speech recognition will be utilized to identify the participants. In one embodiment, each VRU includes in its stream of words not only time stamps but also the name, of the participants in one embodiment. In another embodiment, controller 110 would identify a stream as being from a particular VRU, would utilize the identification of the participant, and insert it upon receiving the stream of words. If speech recognition is to be utilized to identify the participant, control is transferred to block 502 which identifies the participant using a speech recognition process. Block 503 then sends the identity to the controller before transferring control to decision block 506. Returning to decision block 501, if the answer is no, block 504 receives the identification from the controller before transferring control to decision block 506.

Decision block 506 determines whether speech is being detected. If the answer is no, decision block 512 determines if the conference is over. The conference is over based on based on the results of decision block 209 of FIG. 2. If the answer in decision block 512 is no, control is transferred back to decision block 506. If the answer is yes, control is transferred to block 513, and the operations of the VRU's are terminate.

Returning to decision block 506, if the answer is yes, block 507 attempts to perform speech recognition for a word. Decision block 508 determines whether a word was recognized. If the answer is no in decision block 508, control is returned to block 507. If the answer in decision block 508 is yes, control is transferred to block 509 that time stamps and identifies the word with the participant before transmission to the controller via block 511. After execution of block 511, control is transferred back to block 506.

Figure 6:
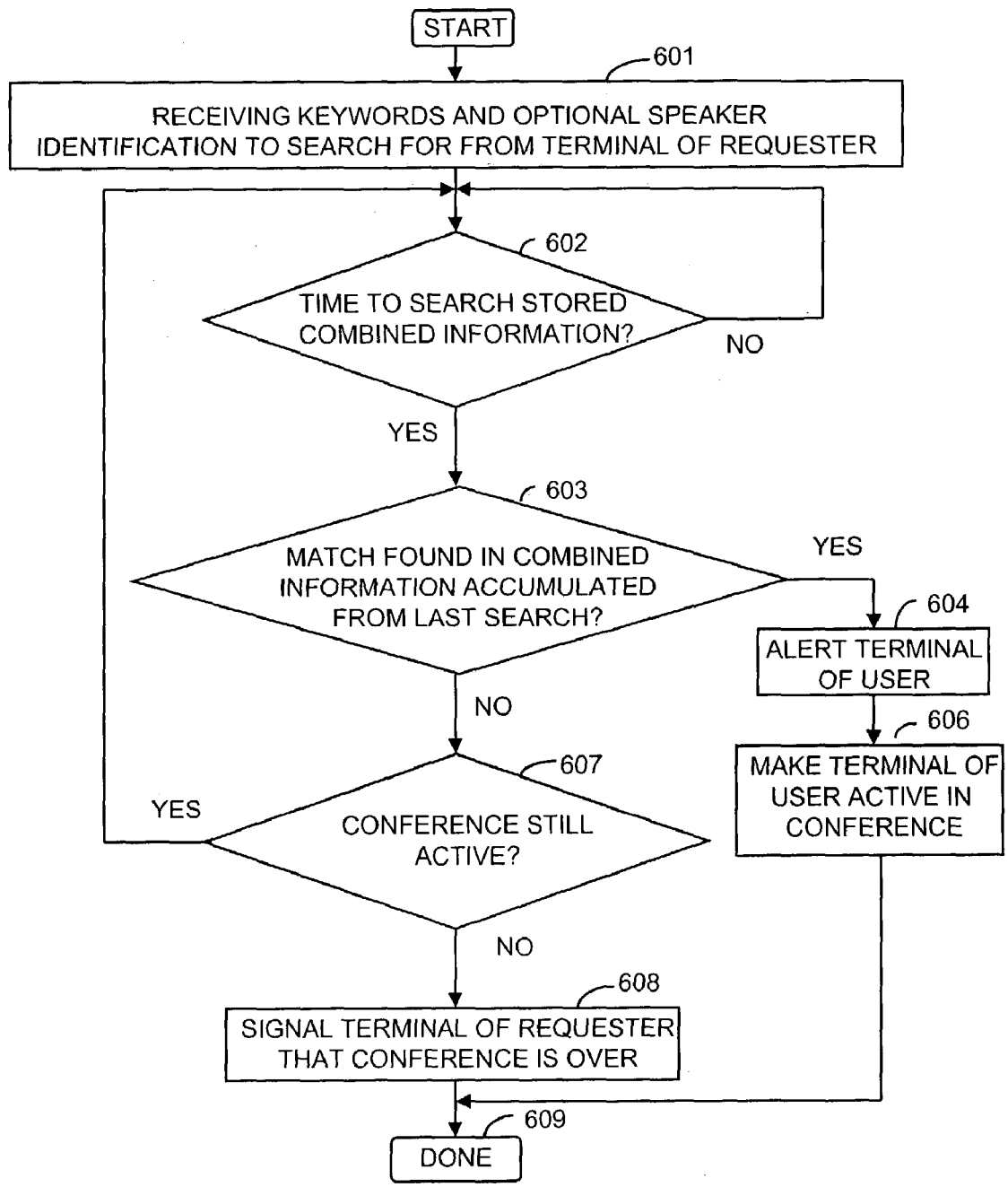

Returning to block 206 of FIG. 2, when decision block 204 determines that a participant wants to be alerted when a topic occurs, control is transferred to block 206 that is illustrated in greater detail in FIG. 6. After being started, block 601 of FIG. 6 receives the key words and an optional speaker identification from the terminal of the requestor. In addition, block 601 controls the terminal for this operation. This received information will be utilized to search the combined information so as to determine when to alert the terminal of the user. One skilled in the art would realize that the key words could be expanded to included additional words using synonym dictionaries, etc. and that these additional words would also be used to search the combined information. As was previously mentioned, the terminal may be playing the conference at a low volume or may be totally muted. Once the identification information is received, decision block 602 determines if it is time to search the stored combined information. Such a search would be done on a periodical basis. If the answer is no in decision block 602, control is returned back to decision block 602. If the answer is yes, decision block 603 utilizes the identification information to determine if a match is found in the combined information that has been accumulated from the last search. If the answer is yes, control is transferred to block 604 which alerts the terminal of the user, and block 606 makes the terminal of the user (participant) active in the conference before transferring control to block 609 that terminates the operations of FIG. 6. Alternatively, block 606 gives the user the option of becoming active or not in the conference since the user maybe engaged in a face-to-face conversation with another individual or some other activity that makes joining the conference undesirable.

Returning to decision block 603, if the answer is no, decision block 607 determines if the conference is still active. If the answer is yes, control is transferred back to decision block 602. If the answer in decision block 607 is no, block 608 signals the terminal requestor that the conference is over before transferring control to block 609.

Returning to decision block 207 of FIG. 2, the latter decision block determines if a participant wants to temporarily leave the conference but still be able to access information about the conference that occurred during their absence. If the answer is yes in decision block 207, control is transferred to block 208 whose operations are illustrated in greater detail in FIGS. 8 and 9. It is possible that the participant does not want to utilize the capabilities of determining when they wish to retrieve conference information based on the topic/speaker search. Once started, decision block 801 determines whether the participant who wishes to temporarily leave the conference wants to institute the use of the topic search. If the answer is no, control is transferred to block 901 of FIG. 9.

Block 901 saves the present time for utilization when the participant returns to the conference. After execution of block 901, control is transferred to decision block 902. Decision block 902 determines if the participant has indicated via their terminal that they are back and want to rejoin the conference. If the answer is no in decision block 902, control is transferred to decision block 903 that determines whether the conference is finished. If the answer is no in decision block 903, control is transferred back to decision block 902. If the answer in decision block 903 is yes, control is transferred to block 908, and the operations of FIGS. 8 and 9 are completed.

Returning to decision block 902, if the participant now wishes to rejoin the conference, block 904 utilizes the stored audio information from the conference and an accelerated speech process starting from the save time to play back the conference from the save time to the present. These accelerated speech operations are performed utilizing techniques such as eliminating portions of silence intervals between words or time domain harmonic scaling or other techniques well known to those skilled in the art. After the accelerated speech has commenced, control is transferred to decision block 906 which determines if the audio information has caught up to the present real time in the conference. If the answer is no in decision block 906, control is transferred back to decision block 906. If the decision in decision block 906 is yes, block 907 stops the accelerated speech process and allows the normal play back of the speech to the participant before transferring control to block 908.

Returning to decision block 801, if the answer is yes, control is transferred to block 802 which obtains the key words and the optional speaker identification from the participant via the participant's terminal. After execution of block 802, control is transferred to block 803 which saves the present time before transferring control to decision block 804. Decision block 804 determines if the participant wishes to return to the conference. If the answer is no, control is transferred to decision block 805 which determines if the conference is over. If the decision in decision block 805 is no, control is transferred back to decision block 804. If the answer in decision block 805 is yes, control is transferred to block 806 and the operations of FIGS. 8 and 9 are done.

Returning to decision block 804, if the answer is yes, control is transferred to decision block 807. Decision block 807 determines if the key words and optional speaker identification can be found in the text that has been saved for the conference thus far. If the answer is no, control is transferred to block 809 which places the participant back in the conference. If the answer is yes in decision block 807, control is transferred to decision block 808. Decision block 808 determines whether the participant is to receive accelerated speech from the time that they left the conference to present. If the answer is no, the participant is placed back into the conference but given access to the text that has been saved to the present time. After execution of block 809, control is transferred to block 811. Returning to decision block 808, if the answer is yes, control is transferred to block 904 of FIG. 9 so that the accelerated speech operation can be performed.

Figure 10:
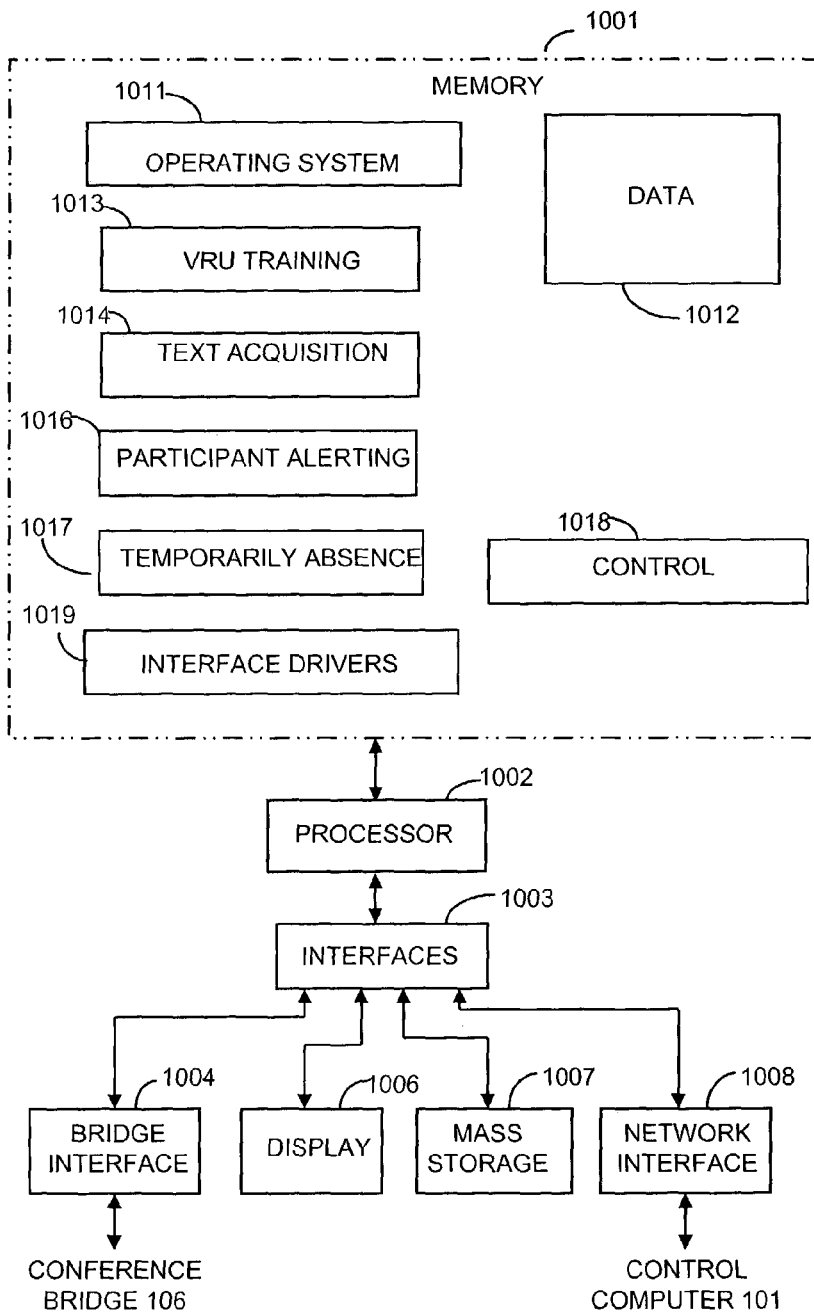
FIG. 10 illustrates, in block diagram form, an embodiment of the controller.

FIG. 10 illustrates, in block diagram form, greater detail of controller 110. Overall control of controller 110 is provided by processor 1002 executing instructions from memory 1001 and storing and retrieving data within memory 1001. Processor 1002 is interconnected to bridge interface 1004, display 1006, mass storage 1007, and network interface 1008 via interfaces 1003. Display 1006 allows processor 1001 to display information to the user and receive user inputs. Network interface 1008 provides an interconnection to control computer 101 of FIG. 1. One skilled in the art would readily realize that conference unit 105 could be connected to any switching element of a network such as illustrated in FIG. 1.

Operating system 1011 provides the overall control of the software functions performed by processor 1002. Routines 1013–1018 provide the operations as illustrated in FIGS. 2–9 in accordance with embodiments of the invention. Interface drivers 1019 provide the necessary support for units connected to interfaces 1003. Although not illustrated in FIG. 10, one skilled in the art would readily realize that other routines and applications could be executed by processor 1002 for various functions. Overall conference control is provided by control routine 1018. VRU training routine 1013 provides the overall control for training a VRU. Text acquisition routine 1014 provides the overall control for assembling the audio information into the combined information in text form. Participant alerting routine 1016 provides the functions of block 206 of FIG. 2. Temporary absence routine 1017 provides the functions of block 208 of FIG. 2.

The operations of controller 110 can be implemented in software, hardware, or a combination thereof. In one embodiment, the operations of controller 110 are implemented in software, as an executable program, that is executed by processor 1002. Processor 1002 is a hardware device for executing software, particularly that stored in memory 1001. Processor 1002 can be any custom made or commercially available processor.

In addition, the combined information and the audio information resulting from the conference can be transferred by conference bridge 106 to controller 110. Upon receipt of this conference information, processor 1002 can store the information either in data 1012 or mass storage 1007.

Figure 11:
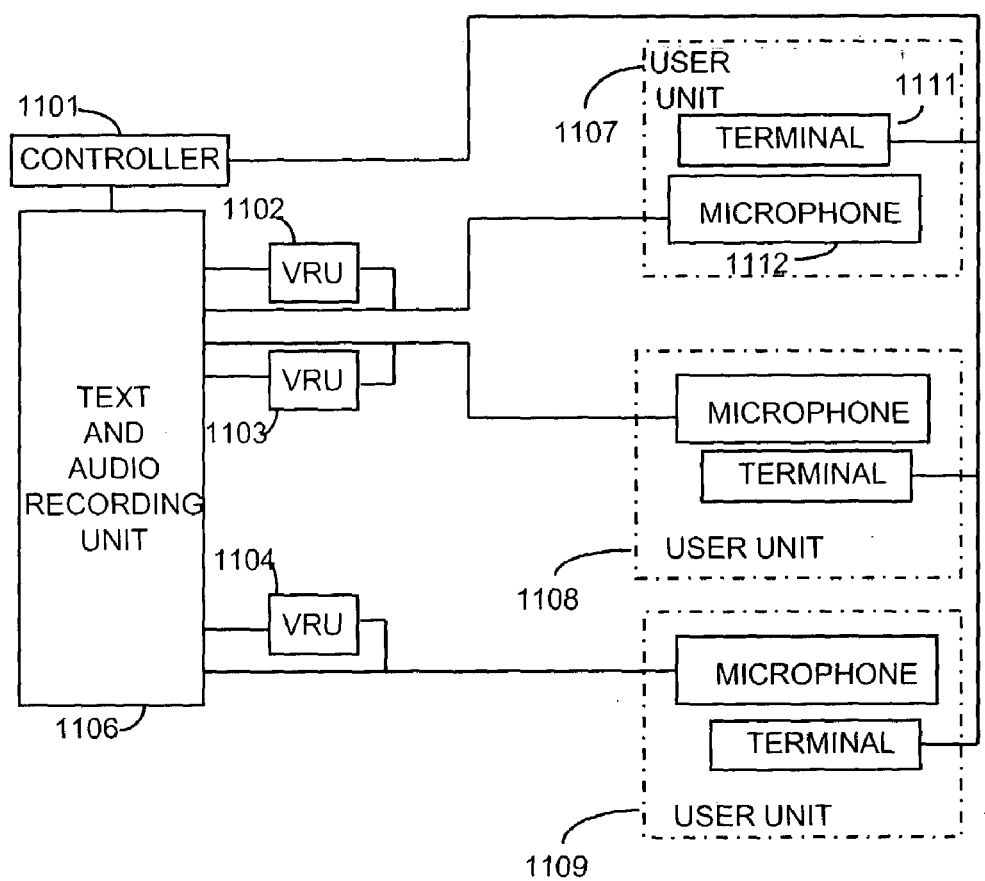
FIG. 11 illustrates another embodiment of the invention.

FIG. 11 illustrates another embodiment of the invention that is designed to be used in a non-telecommunication environment. This embodiment is intended for use with live conferences, courtrooms, or other meetings where it is desirable to have both a text and an audio recording of the proceedings. Each participant in the meeting would have assigned to them a user unit such as user units 1107–1109. Each user unit could have a microphone such as microphone 1112 and a terminal such as terminal 1111. The terminals may not be provided any sort of control or feedback of the audio or textual information that was being gathered from the meeting. Units 1101–1106 perform similar functions to those performed in corresponding units on FIG. 1. However, controller 1101 would provide all control functions. In addition, controller 1101 could also be responsible for the assembly of the combined text information and storage of the audio information; or these functions could be performed by text and audio recording unit 1106. Unit 1106 in certain applications can be combined with controller 1101. Controller 1101 could provide the participant terminals with textual information and audio information resulting from the meeting and provide features such as those described with respect to FIG. 2. One skilled in the art could envision many environments where the embodiment of the invention illustrated in FIG. 11 could be utilized.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method of providing participation in a conference, comprising the steps of:
    converting voice information from all participants of a conference into textual information;
    combining the textual information with periodic time information to form combined information;
    storing the voice information with periodic time information;
    receiving keywords and an indication of absence from the conference from a telecommunication unit used by one of the participants;
    searching the combined information with the keywords to identity a first time when one or more of the keywords occur in the combined information;
    receiving an indication of return to conference from the telecommunication unit;
    determining a second time when the indication of return to conference was received from the telecommunication unit;
    accessing the stored voice information with the first time and determining the portion of the stored voice information between the first and second times; and reproducing the determined portion to the one of the participants via the telecommunication unit.

2. The method of claim 1 wherein the step of reproducing comprises the step of accelerating the reproduction of the determined portion.

3. The method of claim 2 further comprises the step of giving the one of the participants access to the textual information between the first and second times.

4. A method of providing participation in a conference, comprising the steps of:
    converting voice information from all participants of a conference into textual information;
    combining the textual information with periodic time information to form combined information and identifying one of the participants who is speaking in the combined information;
    storing the voice information with periodic time information;
    receiving keywords, speaker identification, and an indication of absence from the conference from a telecommunication unit used by one of the participants;
    searching the combined information with the keywords and speaker identification to determine a first time when one or more of the keywords is spoken by the identified speaker occur in the combined information;
    receiving an indication of return to conference from the telecommunication unit;
    determining a second time when the indication of return to conference was received from the telecommunication unit;
    accessing the stored voice information with the first time and determining the portion of the stored voice information between the first and second times; and
    reproducing the determined portion to the one of the participants via the telecommunication unit.

5. The method of claim 4 wherein the step of reproducing comprises the step of accelerating the reproduction of the determined portion.

6. The method of claim 5 further comprises the step of giving the one of the participants access to the textual information between the first and second times.

7. A method of providing participation in a conference, comprising the steps of:
    converting voice information from all participants of a conference into textual information;
    combining the textual information with periodic time information to form combined information;
    storing the voice information with periodic time information;
    receiving keywords and an indication for alerting from a telecommunication unit used by one of the participants;
    searching the combined information with the keywords to determine a first time when one or more of the keywords occur in the combined information;
    alerting the one of the participants;
    activating the telecommunication unit in the conference;
    muting the conference on telecommunication unit when the indication of alerting is received; and
    the step of alerting comprises the step of unmuting the telecommunication unit.

8. The method of claim 7 further comprises the step of giving the one of the participants access to the textual information between a conference start time and a time of the alerting.

9. A method of providing participation in a conference comprising the steps of:
    converting voice information from all participants of a conference into textual information;
    combining the textual information with periodic time information to form combined information;
    storing the voice information with periodic time information;

receiving keywords and an indication for alerting from a telecommunication unit used by one of the participants;
searching the combined information with the keywords to determine a first time when one or more of the keywords occur in the combined information;
alerting the one of the participants;
activating the telecommunication unit in the conference;
reducing volume of the conference on telecommunication unit when the indication of alerting is received; and
the step of alerting comprises the step of transmitting a tone to the telecommunication unit.

10. The method of claim 9 further comprises the step of giving the one of the participants access to the textual information between a conference start time and a time of the alerting.

11. A method of providing participation in a conference, comprising the steps of:
converting voice information from all participants of a conference into textual information;
combining the textual information with periodic time information to form combined information and identifying one of the participants who is speaking in the combined information;
storing the voice information with periodic time information;
receiving keywords, speaker identification, and an indication for alerting from the conference from a telecommunication unit used by one of the participants;
searching the combined information with the keywords and speaker identification to determine when one or more of the keywords is spoken by the identified speaker occur in the combined information;
alerting the one of the participants; and
activating the telecommunication unit in the conference;
muting the conference on telecommunication unit when the indication of alerting is received; and
the step of alerting comprises the step of unmuting the telecommunication unit.

12. The method of claim 11 further comprises the step of giving the one of the participants access to the textual information between a conference start time and a time of the alerting.

13. A method of providing participation in a conference, comprising the steps of:
converting voice information from all participants of a conference into textual information;
combining the textual information with periodic time information to form combined information and identifying one of the participants who is speaking in the combined information;
storming the voice information with periodic time information;
receiving keywords, speaker identification, and an indication for alerting from the conference from a telecommunication unit used by one of the participants;
searching the combined information with the keywords and speaker identification to determine when one or more of the key words is spoken by the identified speaker occur in the combined information;
alerting the one of the participants; and
activating the telecommunication unit in the conference;
reducing volume of the conference on telecommunication unit when the indication of alerting is received; and
the step of alerting comprises the step of transmitting a tone to the telecommunication unit.

14. The method of claim 13 further comprises the step of giving the one of the participants access to the textual information between a conference start time and a time of the alerting.

15. A method of providing participation in a conference, comprising the steps of:
converting voice information from all participants of the conference into textual information;
combining the textual information with periodic time information to form combined information;
receiving keywords and an indication for alerting from a telecommunication unit used by one of the participants;
searching the combined information with the keywords to determine a first time when one or more of the keywords occur in the combined information;
alerting the one of the participants;
activating the telecommunication unit in the conference;
muting the conference on telecommunication unit when the indication of alerting is received; and
the step of alerting comprises the step of unmuting the telecommunication unit.

16. The method of claim 15 further comprises the step of giving the one of the participants access to the textual information between a conference start time and a time of the alerting.

17. A method of providing participation in a conference, comprising the steps of:
converting voice information from all participants of the conference into textual information;
combining the textual information with periodic time information to form combined information;
receiving keywords and an indication for alerting from a telecommunication unit used by one of the participants;
searching the combined information with the keywords to determine a first time when one or more of the keywords occur in the combined information;
alerting the one of the participants;
activating the telecommunication unit in the conference;
reducing volume of the conference on telecommunication unit when the indication of alerting is received; and
the step of alerting comprises the step of transmitting a tone to the telecommunication unit.

18. The method of claim 17 further comprises the step of giving the one of the participants access to the textual information between a conference start time and a time of the alerting.

19. A method of providing participation in a conference, comprising the steps of:
converting voice information from all participants of the conference into textual information;
combining the textual information with periodic time information to form combined information;
identifying one of the participants who is speaking in the combined information;
receiving keywords, speaker identification, and an indication for alerting from the conference from a telecommunication unit used by one of the participants;
searching the combined information with the keywords and speaker identification to determine when one or more of the keywords is spoken by the identified speaker occur in the combined information;
alerting the one of the participants; and
activating the telecommunication unit in the conference;
muting the conference on telecommunication unit when the indication of alerting is received; and
the step of alerting comprises the step of unmuting the telecommunication unit.

20. The method of claim 19 further comprises the step of giving the one of the participants access to the textual information between a conference start time and a time of the alerting.

21. A method of providing participation in a conference, comprising the steps of:
converting voice information from all participants of the conference into textual information;
combining the textual information with periodic time information to form combined information;
identifying one of the participants who is speaking in the combined information;
receiving keywords, speaker identification, and an indication for alerting from the conference from a telecommunication unit used by one of the participants;
searching the combined information with the keywords and speaker identification to determine when one or more of the keywords is spoken by the identified speaker occur in the combined information;
alerting the one of the participants; and
activating the telecommunication unit in the conference;
reducing volume of the conference on telecommunication unit when the indication of alerting is received; and
the step of alerting comprises the step of transmitting a tone to the telecommunication unit.

22. The method of claim 21 further comprises the step of giving the one of the participants access to the textual information between a conference start time and a time of the alerting.

23. A processor-readable medium comprising processor-executable instructions configured for:
converting voice information from all participants of a conference into textual information;
combining the textual information with periodic time information to form combined information;
storing the voice information with periodic time information;
receiving keywords and an indication of absence from the conference from a telecommunication unit used by one of the participants;
searching the combined information with the keywords to identity a first time when one or more of the keywords occur in the combined information;
receiving an indication of return to conference from the telecommunication unit;
determining a second time when the indication of return to conference was received from the telecommunication unit;
accessing the stored voice information with the first time and determining the portion of the stored voice information between the first and second times; and
reproducing the determined portion to the one of the participants via the telecommunication unit.

24. The processor-readable medium of claim 23 wherein the reproducing comprises accelerating the reproduction of the determined portion.

25. The processor-readable medium of claim 24 further comprises giving the one of the participants access to the textual information between the first and second times.

26. A processor-readable medium comprising processor-executable instructions configured for:
converting voice information from all participants of a conference into textual information;
combining the textual information with periodic time information to form combined information and identifying one of the participants who is speaking in the combined information;
storing the voice information with periodic time information;
receiving keywords, speaker identification, and an indication of absence from the conference from a telecommunication unit used by one of the participants;
searching the combined information with the keywords and speaker identification to determine a first time when one or more of the keywords is spoken by the identified speaker occur in the combined information;
receiving an indication of return to conference from the telecommunication unit;
determining a second time when the indication of return to conference was received from the telecommunication unit;
accessing the stored voice information with the first time and determining the portion of the stored voice information between the first and second times; and
reproducing the determined portion to the one of the participants via the telecommunication unit.

27. The processor-readable medium of claim 26 wherein the reproducing comprises accelerating the reproduction of the determined portion.

28. The processor-readable medium of claim 27 further comprises giving the one of the participants access to the textual information between the first and second times.

29. A processor-readable medium comprising processor-executable instructions configured for:
converting voice information from all participants of a conference into textual information;
combining the textual information with periodic time information to form combined information;
storing the voice information with periodic time information;
receiving keywords and an indication for alerting from a telecommunication unit used by one of the participants;
searching the combined information with the keywords to determine a first time when one or more of the keywords occur in the combined information;
alerting the one of the participants; and
activating the telecommunication unit in the conference;
muting the conference on telecommunication unit when the indication of alerting is received; and
the alerting comprises unmuting the telecommunication unit.

30. The processor-readable medium of claim 29 further comprises giving the one of the participants access to the textual information between a conference start time and a time of the alerting.

31. A processor-readable medium comprising processor-executable instructions configured for:
converting voice information from all participants of a conference into textual information;
combining the textual information with periodic time information to form combined information;
storing the voice information with periodic time information;
receiving keywords and an indication for alerting from a telecommunication unit used by one of the participants;
searching the combined information with the keywords to determine a first time when one or more of the keywords occur in the combined information;
alerting the one of the participants; and
activating the telecommunication unit in the conference;
reducing volume of the conference on telecommunication unit when the indication of alerting is received; and
the alerting comprises transmitting a tone to the telecommunication unit.

32. The processor-readable medium of claim 31 further comprises giving the one of the participants access to the textual information between a conference start time and a time of the alerting.

33. A processor-readable medium comprising processor-executable instructions configured for:
    converting voice information from all participants of a conference into textual information;
    combining the textual information with periodic time information to form combined information and identifying one of the participants who is speaking in the combined information;
    storing the voice information with periodic time information;
    receiving keywords, speaker identification, and an indication for alerting from the conference from a telecommunication unit used by one of the participants;
    searching the combined information with the keywords and speaker identification to determine when one or more of the keywords is spoken by the identified speaker occur in the combined information;
    alerting the one of the participants; and
    activating the telecommunication unit in the conference;
    muting the conference on telecommunication unit when the indication of alerting is received; and
    the alerting comprises unmuting the telecommunication unit.

34. The processor-readable medium of claim 33 further comprises giving the one of the participants access to the textual information between a conference start time and a time of the alerting.

35. A processor-readable medium comprising processor-executable instructions configured for:
    converting voice information from all participants of a conference into textual information;
    combining the textual information with periodic time information to form combined information and identifying one of the participants who is speaking in the combined information;
    storing the voice information with periodic time information;
    receiving keywords, speaker identification, and an indication for alerting from the conference from a telecommunication unit used by one of the participants;
    searching the combined information with the keywords and speaker identification to determine when one or more of the keywords is spoken by the identified speaker occur in the combined information;
    alerting the one of the participants; and
    activating the telecommunication unit in the conference;
    reducing volume of the conference on telecommunication unit when the indication of alerting is received; and
    the alerting comprises transmitting a tone to the telecommunication unit.

36. The processor-readable medium of claim 35 further comprises giving the one of the participants access to the textual information between a conference start time and a time of the alerting.

37. A processor-readable medium comprising processor-executable instructions configured for:
    converting voice information from all participants of the conference into textual information;
    combining the textual information with periodic time information to form combined information;
    receiving keywords and an indication for alerting from a telecommunication unit used by one of the participants;
    searching the combined information with the keywords to determine a first time when one or more of the keywords occur in the combined information;
    alerting the one of the participants; and
    activating the telecommunication unit in the conference;
    muting the conference on telecommunication unit when the indication of alerting is received; and
    the alerting comprises unmuting the telecommunication unit.

38. The processor-readable medium of claim 37 further comprises giving the one of the participants access to the textual information between a conference start time and a time of the alerting.

39. A processor-readable medium comprising processor-executable instructions configured for:
    converting voice information from all participants of the conference into textual information;
    combining the textual information with periodic time information to form combined information;
    receiving keywords and an indication for alerting from a telecommunication unit used by one of the participants;
    searching the combined information with the keywords to determine a first time when one or more of the keywords occur in the combined information;
    alerting the one of the participants; and
    activating the telecommunication unit in the conference;
    reducing volume of the conference on telecommunication unit when the indication of alerting is received; and
    the alerting comprises transmitting a tone to the telecommunication unit.

40. The processor-readable medium of claim 39 further comprises giving the one of the participants access to the textual information between a conference start time and a time of the alerting.

41. A processor-readable medium comprising processor-executable instructions configured for:
    converting voice information from all participants of the conference into textual information;
    combining the textual information with periodic time information to form combined information;
    identifying one of the participants who is speaking in the combined information;
    receiving keywords, speaker identification, and an indication for alerting from the conference from a telecommunication unit used by one of the participants;
    searching the combined information with the keywords and speaker identification to determine when one or more of the keywords is spoken by the identified speaker occur in the combined information;
    alerting the one of the participants; and
    activating the telecommunication unit in the conference;
    muting the conference on telecommunication unit when the indication of alerting is received; and
    the alerting comprises unmuting the telecommunication unit.

42. The processor-readable medium of claim 41 further comprises giving the one of the participants access to the textual information between a conference start time and a time of the alerting.

43. A processor-readable medium comprising processor-executable instructions configured for:
    converting voice information from all participants of the conference into textual information;
    combining the textual information with periodic time information to form combined information;

identifying one of the participants who is speaking in the combined information;
receiving keywords, speaker identification, and an indication for alerting from the conference from a telecommunication unit used by one of the participants;
searching the combined information with the keywords and speaker identification to determine when one or more of the keywords is spoken by the identified speaker occur in the combined information;
alerting the one of the participants; and
activating the telecommunication unit in the conference;
reducing volume of the conference on telecommunication unit when the indication of alerting is received; and
the alerting comprises transmitting a tone to the telecommunication unit.

44. The processor-readable medium of claim 43 further comprises giving the one of the participants access to the textual information between a conference start time and a time of the alerting.

* * * * *